IRVING S. REED
INVENTOR.

BY Lindenberg & Freilich

ATTORNEYS

INVENTOR.
IRVING S. REED
BY Lindenberg + Freilich
ATTORNEYS

INVENTOR.
IRVING S. REED
BY Lindenberg + Freilich
ATTORNEYS

IRVING S. REED
INVENTOR.

BY Lindenberg & Freilich
ATTORNEYS

United States Patent Office 3,529,141
Patented Sept. 15, 1970

3,529,141
ERROR TOLERANT SEQUENTIAL CIRCUITS
Irving S. Reed, Santa Monica, Calif., assignor to Technology Service Corporation, Santa Monica, Calif., a corporation of California
Filed Sept. 5, 1967, Ser. No. 665,524
Int. Cl. G05b *23/02;* G06m *3/12*
U.S. Cl. 235—153 10 Claims

ABSTRACT OF THE DISCLOSURE

A failure to tolerant binary circuit is a multibit sequential circuit with additional parity bits. At each internal state of the counter, the parity bits are driven to a known state relationship. Redundant logic is employed to control the change of states of the various bits so that even when one or more of the bits or logic elements fails, a minimum combination of bits and elements are included in the counter to define correctly each of its internal states.

BACKGROUND OF THE INVENTION

The invention generally relates to binary circuits and more particularly to sequential binary circuits with error-correcting capabilities.

Since the early stages of the development of digital networks, the desirability to develop error tolerant networks has been apparent. The use of coding theory in such a design has been extensively considered. Examples of binary codes are the Hamming Code, the Reed-Muller Code and others. One of the primary motivations for the development of error correcting codes, was the need to increase computer reliability.

Since then attempts have been made to broaden the use of error correcting codes to design a truly error-tolerant sequential circuit, i.e. a sequential circuit in which one or more logical components or elements may fail anywhere in the circuit without affecting the circuit's desired output. However most of these attempts have either failed or met with limited success. Thus a need still exists for a technique by which a truly error-tolerant sequential circuit can be designed which utilizes error-correcting codes.

OBJECTS AND SUMMARY OF THE INVENTION

The primary purpose of this invention is to provide a novel error-tolerant sequential circuit based on a practical design technique.

Another odject of this invention is to provide a sequential circuit which is implementable with state "of the art" techniques and one which provides a correct output despite the failure of one or more logical components therein.

A further object of this invention is to provide a novel sequential circuit, whose design and interconnections are based on a new approach to the utilization of coding theory in the design of an error-tolerant sequential circuit.

Still a further object of this invention is to provide a novel binary sequential counter which includes an arrangement to provide a correct multibit output irrespective of the failure of not more than some predetermined number of logic elements therein.

Yet another object of this invention is to provide a multibit counter which is tolerant to an error in more than one logic element therein.

A further purpose is to provide a novel arrangement in which individual redundant counters are interconnected to provide a counter of increased bit length which operates correctly despite the failure of any one element therein.

These and other objects of the invention are achieved by providing a sequential circuit which has the number of data bits necessary to define the various internal states of the circuit and a number of check or parity bits. For each internal state of the circuit the state of the parity bits is predetermined by a method to be described hereafter in detail. Once the states of the parity bits are determined, the signals necessary to sequentially drive both the data bits and check bits from one internal state to another are derived. The circuit includes redundant logic circuits so that when less than some maximum number of bits or logic circuits fail, a sufficient number of elements or logic circuits within the sequential circuit contain information from which the correct circuit output can be obtained.

To illustrate, consider a 3-bit sequential binary counter, having eight internal states. For one bit error tolerance, three parity bits are required. For each of the eight internal states of the counter, the correct value of each parity bit is determined. The counter includes redundant logic circuits so that a correct change in state of either a data or parity bit is achieved. The circuit redundancy is such that it allows for the failure of any one bit or any one of the logic circuits required to drive the counter. If one bid or a logic circuit which is associated therewith fails, at least one combination of six bits always exists from which a correct output circuit can be derived.

The features of this invention which are considered novel are set forth in detail in the appended claims. The invention is best understood from the following description when read in conjunction with the accompanying drawings.

DESCRIPTION OF THE PREFERRED EMBODIMENTS

Figure 1:
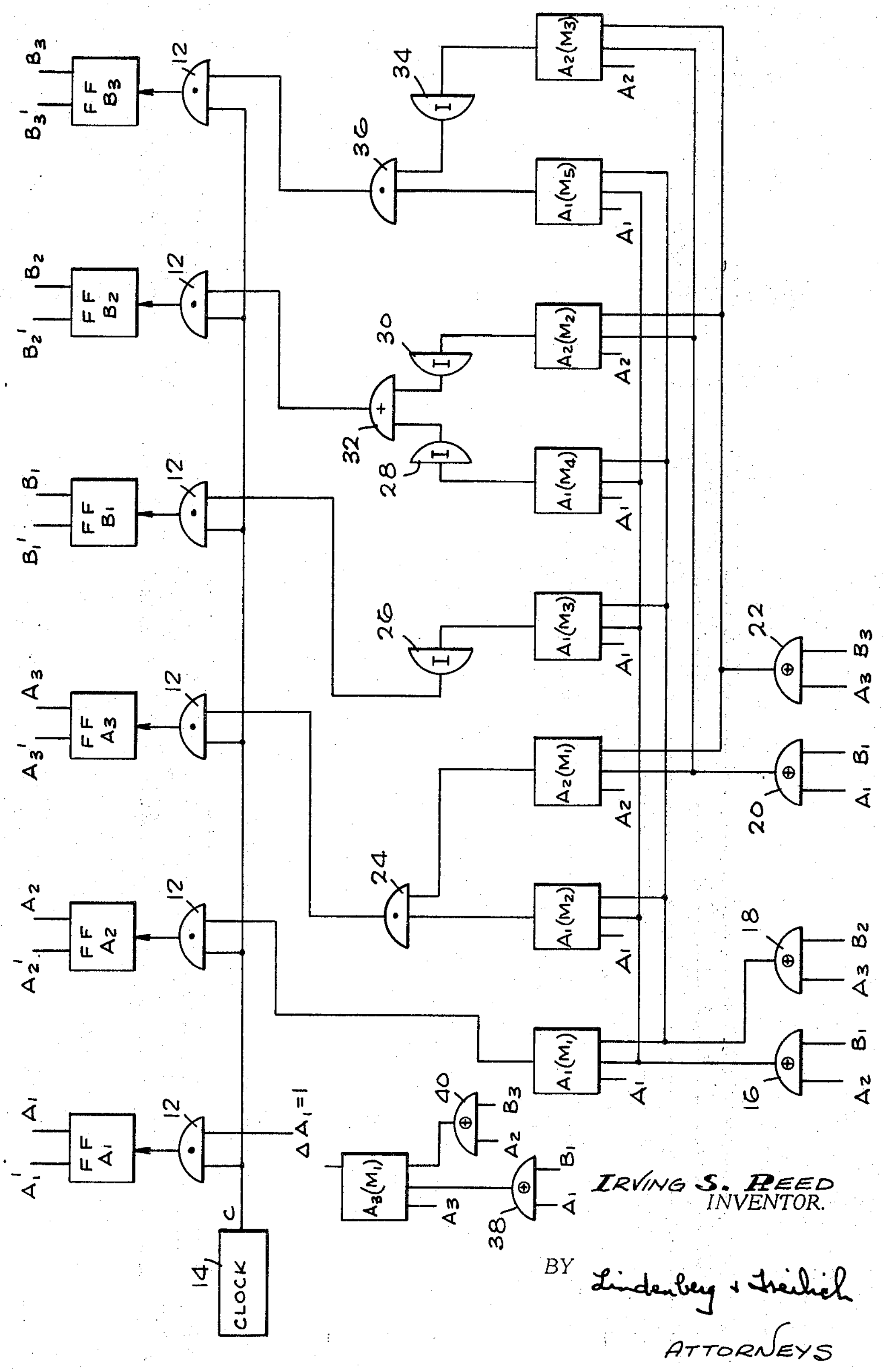
FIG. 1 is a block diagram of one embodiment of a 3-bit counter with one error tolerance which is in accord with the present invention.

Before proceeding to describe the general technique by which error-tolerant sequential circuits are designed in accord with the present invention, refer to FIG. 1. The figure is a block diagram of one embodiment of a 3-bit binary counter which will allow for the correction of one error, i.e. it provides a correct 3-bit output for each of the counter's possible eight internal states when any one element or circuit therein fails. In FIG. 1 $FFA_1$, $FFA_2$ and $FFA_3$ are three single-input trigger flip-flops corresponding to those of a conventional 3-bit counter. $FFB_1$, $FFB_2$ and $FFB_3$ are the check or parity bit flip-flops. The latter flip-flops together with the rest of the logic circuits, shown in FIG. 1, serve to provide the counter's one-error tolerance. Hereafter, a flip-flop will sometimes be called a bistable element.

Each flip-flop is triggered or caused to change state by a pulse from AND gate 12. A flip-flop changes state from a "1" to "0" or "0" to "1" when the output of gate 12 is a pulse. The function of the counter is to sequentially count clock pulses C supplied from a source such as clock 14. The output of clock 14 is connected to one input of each of gates 12 so that one or more of the flip-flops can be caused to change simultaneously. However, a flip-flop changes state if and only if the change of state signal supplied at the other input of AND gate 12 is true or "1."

In FIG. 1 a nonprimed output, such as $A_1$, is true or "1" if and only if the flip-flop is in state "1." A primed output, such as $A_1'$ which denotes negation, is true or "1" if and only if the flip-flop is in state "0." Also in the figures $+$, $\cdot$ and $\oplus$ denote OR, AND and EXCLUSIVE OR operations, respectively.

As in a conventional 3-bit binary counter, the counter of the present invention has the desired successive sequence of states for $FFA_1$, $FFA_2$ and $FFA_3$ is shown in the following Table 1.

TABLE 1

| State | $FFA_1$ | $FFA_2$ | $FFA_3$ |
|---|---|---|---|
| $S_0$ | 0 | 0 | 0 |
| $S_1$ | 1 | 0 | 0 |
| $S_2$ | 0 | 1 | 0 |
| $S_3$ | 1 | 1 | 0 |
| $S_4$ | 0 | 0 | 1 |
| $S_5$ | 1 | 0 | 1 |
| $S_6$ | 0 | 1 | 1 |
| $S_7$ | 1 | 1 | 1 |
| $S_0$ | 0 | 0 | 0 |
| . | . | . | . |
| . | . | . | . |
| . | . | . | . |

From Table 1 it is apparent that the change of state signal for $FFA_1$, designated by $\Delta A_1$, is 1 since $FFA_1$ has to change state with each clock signal or pulse. $\Delta A_2 = A_1$ since $FFA_2$ changes state each time $FFA_1$ is in state "1" or simply "1." Similarly $\Delta A_3 = A_1 A_2$ since a change of state occurs in $FFA_3$ whenever both $A_1$ and $A_2$ are equal to "1."

In order to provide the counter with the one error tolerance the value of each parity flip-flop is determined for each of the counter's eight internal states $S_0$–$S_7$, shown in Table 1. The values of the data flip-flops $A_i$ and the parity flip-flops $B_i$ at each internal state of the desired error-tolerant counter are shown in Table 2.

TABLE 2

| State | $FFA_1$ | $FFA_2$ | $FFA_3$ | $FFB_1$ | $FFB_2$ | $FFB_3$ |
|---|---|---|---|---|---|---|
| $S_0$ | 0 | 0 | 0 | 0 | 0 | 0 |
| $S_1$ | 1 | 0 | 0 | 1 | 1 | 0 |
| $S_2$ | 0 | 1 | 0 | 1 | 0 | 1 |
| $S_3$ | 1 | 1 | 0 | 0 | 1 | 1 |
| $S_4$ | 0 | 0 | 1 | 0 | 1 | 1 |
| $S_5$ | 1 | 0 | 1 | 1 | 0 | 1 |
| $S_6$ | 0 | 1 | 1 | 1 | 1 | 0 |
| $S_7$ | 1 | 1 | 1 | 0 | 0 | 0 |
| $S_0$ | 0 | 0 | 0 | 0 | 0 | 0 |

The values of the parity flip-flops or bits ($B_i$) have not been chosen arbitrarily. Rather they are determined systematically from an error correcting code in a manner which is described hereafter in detail. For Table 2 one can show that the value or state of each of the data flip-flops, i.e., its output may be expressed in terms of the outputs or states of the other bits. $A_1$, $A_2$ and $A_3$ may be expressed as follows:

$$A_1 = A_2 \oplus B_1 = A_3 \oplus B_2$$
$$A_2 = A_1 \oplus B_1 = A_3 \oplus B_3$$
$$A_3 = A_1 \oplus B_2 = A_2 \oplus B_3 \quad (1)$$

From Equation (1) it is seen that there are exactly three independent determinations for $A_i$ ($i=1, 2, 3$). Define the majority of circuits $$A_1(M_k) = Maj_k(A_1, A_2 \oplus B_1, A_3 \oplus B_2)$$
$$A_2(M_k) = Maj_k(A_2, A_1 \oplus B_1, A_3 \oplus B_3)$$
$$A_3(M_k) = Maj_k(A_3, A_1 \oplus B_1, A_2 \oplus B_3) \quad (2)$$

where $$Maj_k(x, y, z) = xy + xz + yz$$

and the subscript $k$ indexes the $k$-th physical realization of this particular majority circuit. It should be noted that all the majority elements of Eq. (2) give the correct outputs if one or less of any of the terms $A_1$, $A_2$, $A_3$, $B_1$, $B_2$ and $B_3$ is wrong.

In the embodiment of the counter shown in FIG. 1 instead of driving gate 12 of $FFA_2$ with the output of $A_2$, i.e. instead of $\Delta A_2 = A_1$, $\Delta A_2$ is given by $\Delta A_2 = A_1(M_1)$ where $M_1$ is the first realization of a majority circuit responding to $A_1$, $A_2 \oplus B_1$, $A_3 \oplus B_2$. This circuit is shown in FIG. 1. The gates performing the logic operations $A_2 \oplus B_1$ and $A_3 \oplus B_2$ are designated by numerals 16 and 18 respectively.

As previously indicated, the change of state signal for $FFA_3$ is $\Delta A_3 = A_1 A_2$. From Table 2 the change of state signals for $FFB_1$, $FFB_2$ and $FFB_3$ may be derived by the standard technique of logical design. The change of state equations for the six flip-flops of FIG. 1 are summarized in the following list:

$$\Delta A_1 = 1$$
$$\Delta A_2 = A_1$$
$$\Delta A_3 = A_1 A_2$$
$$\Delta B_1 = A_1'$$
$$\Delta B_2 = A_1' + A_2'$$
$$\Delta B_3 = A_1 A_2' \quad (3)$$

In accordance with the teachings of the present invention whenever $A_1$ has to be employed, the output of a different majority circuit which responds to $A_1$, $A_2 \oplus B_1$ and $A_3 \oplus B_2$ is employed. Similarly, whenever $A_1'$ is required the inverted output of a different $A_1$ majority circuit is used. Likewise, instead of $A_2$ the output of a majority circuit is utilized. From the second line of Eq. 2 such a majority circuit responds to $A_2$, $A_1 \oplus B_1$ and $A_3 \oplus B_3$. In FIG. 1 gates 20 and 22 perform the EXCLUSIVE OR operations $A_1 \oplus B_1$ and $A_3 \oplus B_3$, respectively.

The change of state equations of Expression 3 may be written by replacing $A_1$, $A_1'$, $A_2$ and $A_2'$ with different realizations of majority circuits, so that $$\Delta A_1 = 1$$
$$\Delta A_2 = A_1(M_1)$$
$$\Delta A_3 = A_1(M_2) A_2(M_1)$$
$$\Delta B_1 = [A_1(M_3)]'$$
$$\Delta B_2 = [A_1(M_4)]' + [A_2(M_2)]'$$
$$\Delta B_3 = [A_1(M_5)][A_2(M_3)]' \quad (4)$$

where $M_1$, $M_2$ . . . etc., are different realizations of majority circuits for $A_1$ or $A_2$ as the case may dictate. These majority circuits are diagrammed in FIG. 1, together with AND gate 24, which AND's the outputs $A_1$ ($M_2$) and $A_2$ ($M_1$) to form $\Delta A_3$. Similarly, inverter 26 inverts $A_1$ ($M_3$) to provide $\Delta B_1$, inverters 28, 30 and OR gate 32 are used to provide $\Delta B_2$ and $\Delta B_3$ is provided by inverter 34 and AND gate 36.

It should be pointed out that the outputs of gates 16 and 18 are used to feed all the $A_1$ $(M_i)$ majority circuits, and similarly the outputs of gates 20 and 22 feed the different realizations of the $A_2$ $(M_i)$ majority circuits. By incorporating different realizations of majority circuits any one majority circuit, the above EXCLUSIVE OR gates (16, 18, 20, 22) or a flip-flop may fail, and yet at least one combination of three elements and majority circuits is available to reconstruct one of the desired internal states of the counter, outlined in Table 1. For example if $FFA_1$ fails the true three bit code for each internal state is present at the output of any one of $A_1$ $(M_i)$ ($i$=1, 2, 3, 4, 5) and $FFA_2$, $FFA_3$.

Next it should be pointed out that if $FFA_3$ or any one of the circuits driving $FFA_3$, e.g. $A_1$ $(M_2)$ or $A_2$ $(M_1)$, fails an erroneous $A_3$ bit may result for the counter's third bit. This however is remedied by incorporating in the counter at least one realization of a $A_3$ majority circuit, designated in FIG. 1 as $A_3$ $(M_1)$. It operates in accordance with the third line of expression (2), responding to $A_3$, $A_1 \oplus B_1$ and $A_2 \oplus B_3$. EXCLUSIVE OR gates 38 and 40 perform the operations $A_1 \oplus B_1$ and $A_2 \oplus B_3$, respectively. Thus, the correct third bit of the three bit code is present at the output of either $FFA_3$, $A_1$ $(M_3)$ or both, for each internal state.

The foregoing described exemplary embodiment of the invention may be summarized as consisting of a sequential circuit (3-bit counter) with built-in error tolerance (one error). This is realized by incorporating extra parity bistable elements $(B_i)$ and utilizing them together with the data elements $(A_i)$ in redundant logic circuits. These redundant circuits in turn provide change-of-state signals to the bistable elements to advance the counter from one internal state to the next. In the foregoing example, majority logic was employed in the redundant logic circuitry. However such logic technique is presented for explanatory purposes rather than as a limitation on the teachings of the invention. Other logic techniques may be employed to provide the same desired error tolerance.

Figure 2:
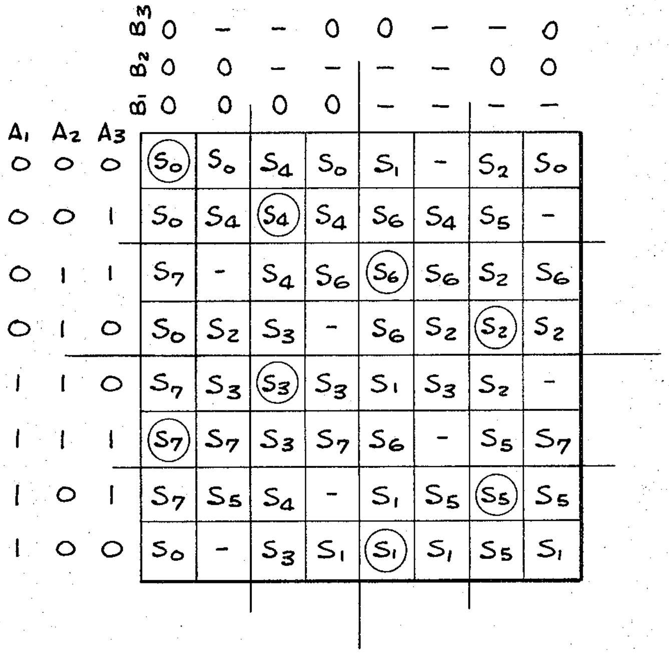
FIG. 2 is the Karnaugh map of the internal states of this counter plotted with respect to its three data bits and three parity bits.

This aspect of the invention may best be explained by plotting the counter's various internal states $(S_0$–$S_7)$ of Table 2 of the Karnaugh map, shown as FIG. 2. Therein the various states $S_0$ through $S_7$ of the counter are plotted. The circled states ( $\textcircled{S_i}$ ) represent the desired error-free states while the uncircled states represent the states with an error in only one of the six bistable elements, $A_1$, $A_2$, $A_3$, $B_1$, $B_2$ and $B_3$. The empty states are "don't care" states of the map. Such a map can be utilized to determine the logic circuits for the required change-of-state signals. The use of a Karnaugh map for logic design is well known in the art.

From Table 2 it is seen that $A_2$ changes state to a succeeding state when the counter is in any one of states $S_1$, $S_3$, $S_5$ and $S_7$. Thus the map of FIG. 2 is utilized by considering only these four plotted states to derive the logic for $\Delta A_2$. Such use is diagrammed in FIG. 3 wherein only states $S_1$, $S_3$, $S_5$ and $S_7$ are plotted. Zone Z1 may be expressed as $A_1 \cdot A_3 \cdot B_2'$. Similarly, zones Z3 through Z8 are represented by $A_1 \cdot A_2 \cdot B_1'$, $A_1 \cdot A_2' \cdot B_1$, $$A_2 \cdot A_3 \cdot B_1' \cdot B_2',\ A_2 \cdot A_3' \cdot B_1' \cdot B_2$$

$A_2' \cdot A_2' \cdot B_1 \cdot B_2$, $A_2' \cdot A_3' \cdot B_1 \cdot B_2$ and $A_2' \cdot A_3 \cdot B_1 \cdot B_2'$, respectively. The join of all zones covers the map of FIG. 3 for $\Delta A_2$. Thus $$\begin{aligned}\Delta A_2 = & A_1A_3B_2' + A_1A_3'B_2 + A_1A_2B_1' + A_1A_2'B_1 \\ & + A_2A_3B_1'B_2' + A_2A_3'B_1'B_2 + A_2'A_3'B_1B_2 \\ & + A_2'A_3B_1B_2 \equiv{}' \alpha_1 \mathrm{S}\end{aligned} \tag{5}$$

The foregoing expression for $\Delta A_2$, which henceforth is denoted by $\alpha_1$, may be implemented by using eight AND gates and feeding the outputs of these gates into a single eight-input OR gate. Such an implementation is diagrammed in FIG. 4. Therein numerals 41–48 designate the eight AND gates and 50 represents the OR gate whose output $\alpha_1$ is the change of state signal for $FFA_2$.

It can easily be shown that the output of OR gate 50 is the same as that of majority circuit $A_1$ $(M_1)$ (FIG. 1) used to provide the change of state signal for $FFA_2$ when majority logic is employed. This can best be demonstrated by expanding the operation of $A_1$ $(M_1)$ and then defining the zones on the Karnaugh map which are included therein.

$$\begin{aligned}A_1(M_1) = & Maj_1(A_1, A_2 \oplus B_1, A_3 \oplus B_2) \\ = & (A_2 \oplus B_1)(A_3 \oplus B_2) + A_1(A_3 \oplus B_2) \\ & + A_1(A_2 \oplus B_1)\end{aligned} \tag{6}$$

Figure 5:
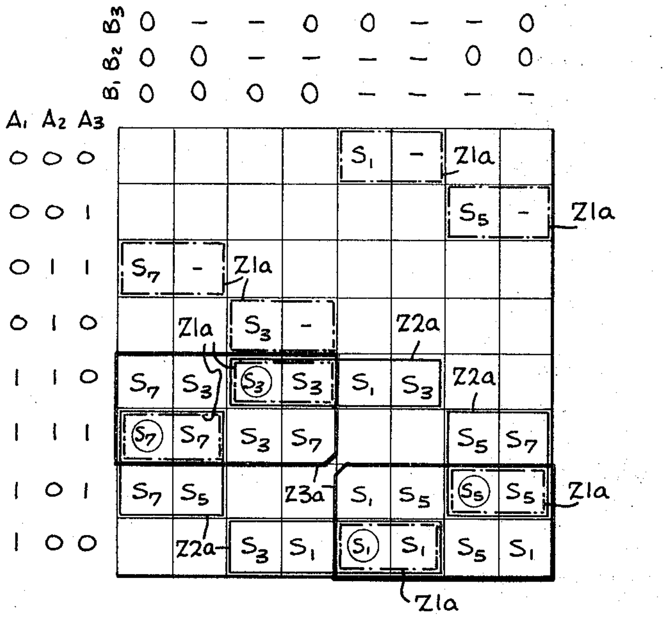
FIG. 5 is another partial Karnaugh map similar to FIG. 3.

In FIG. 5 zone Z1$a$ defines the function $(A_2 \oplus B_1)(A_3 \oplus B_2)$, while zone Z2$a$ define the function $A_1(A_3 \oplus B_2)$. Function $A_1(A_2 \oplus B_1)$ is defined by zone Z3$a$.

Figure 3:
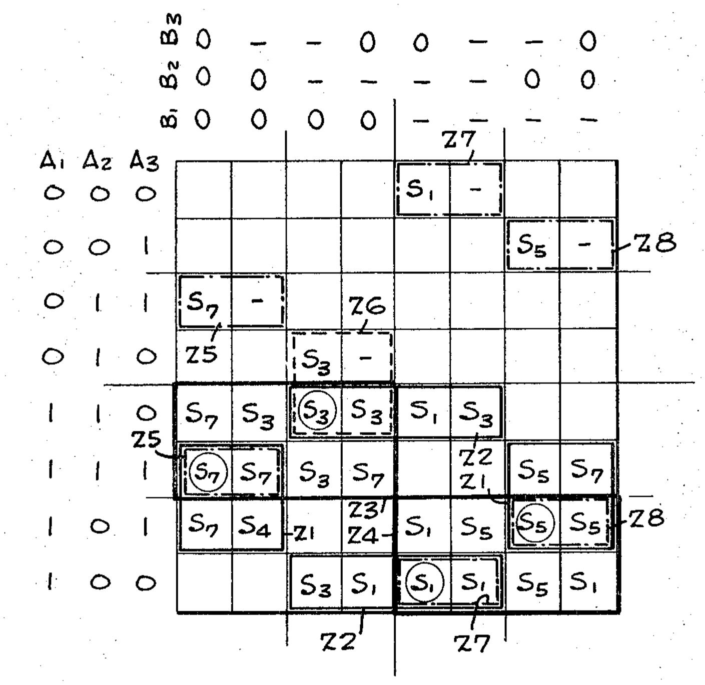
FIG. 3 is a partial Karnaugh map of selected states.

By comparing the maps of FIGS. 3 and 5, it is clearly seen that the identical zone pattern is defined in each of them. Thus it should be appreciated that the same change-of-state signal is supplied to $FFA_2$ when majority logic is employed as shown in FIG. 1 or when the signal is provided by the logic arrangement shown in FIG. 4. The map of FIG. 2 may be similarly utilized to derive the logic necessary to generate the change-of-state signals for the other bistable elements, i.e. $FFA_3$, $FFB_1$ $FFB_2$, $FFB_3$. As seen from Table 2 state $S_3$ and $S_7$ need be considered for $\Delta A_3$, while states $S_0$, $S_2$, $S_4$ and $S_6$ are required for $\Delta B_1$. Similarly, for $\Delta B_2$ states $S_0$, $S_1$, $S_2$, $S_4$, $S_5$ and $S_6$ need be considered and for $\Delta B_3$ only states $S_1$ and $S_5$ are of importance. The logic equations which could be so derived are summarized below:

$$\begin{aligned}\Delta A_2 = & A_1A_3B_2' + A_1A_3'B_2 + A_1A_2B_1' + A_1A_2'B_1 \\ & + A_2A_3B_1'B_2' + A_2A_3'B_1'B_2 + A_2'A_3'B_1B_2 \\ & + A_2'A_3B_1B_2' \equiv \alpha_1 \\ \Delta A_3 = & A_1A_2B_2'B_3' + A_1A_3'B_1'B_3 + A_2A_3B_1'B_2' \\ & + A_1A_2B_2B_3 + A_1A_3B_1'B_3' + A_2A_3'B_1'B_2 \equiv \alpha_2 \\ \Delta B_1 = & A_1'A_3'B_2' + A_1'A_3B_2 + A_1'A_2'B_1' + A_1'A_2B_1 \\ & + A_2'A_3'B_1'B_2' + A_2'A_3B_1'B_2 + A_2A_3B_1B_2 \\ & + A_2A_3'B_1B_2' \equiv \beta_1 \\ \Delta B_2 = & A_1'A_2' + A_2'A_3'B_3' + A_2'A_3B_3 + A_1'A_3'B_2' \\ & + A_1'B_1B_2B_3' + B_1B_2'B_3 + A_1'A_3B_2 + A_2'B_1 \equiv \beta_2 \\ \Delta B_3 = & A_1A_2'B_2'B_3 + A_1A_3'B_1B_3' + A_2'A_3B_1B_2' \\ & + A_1A_2'B_2B_3' + A_2'A_3'B_1B_2 + A_1A_3B_1B_3 \equiv \beta_3\end{aligned} \tag{7}$$

Figures 4, 6:
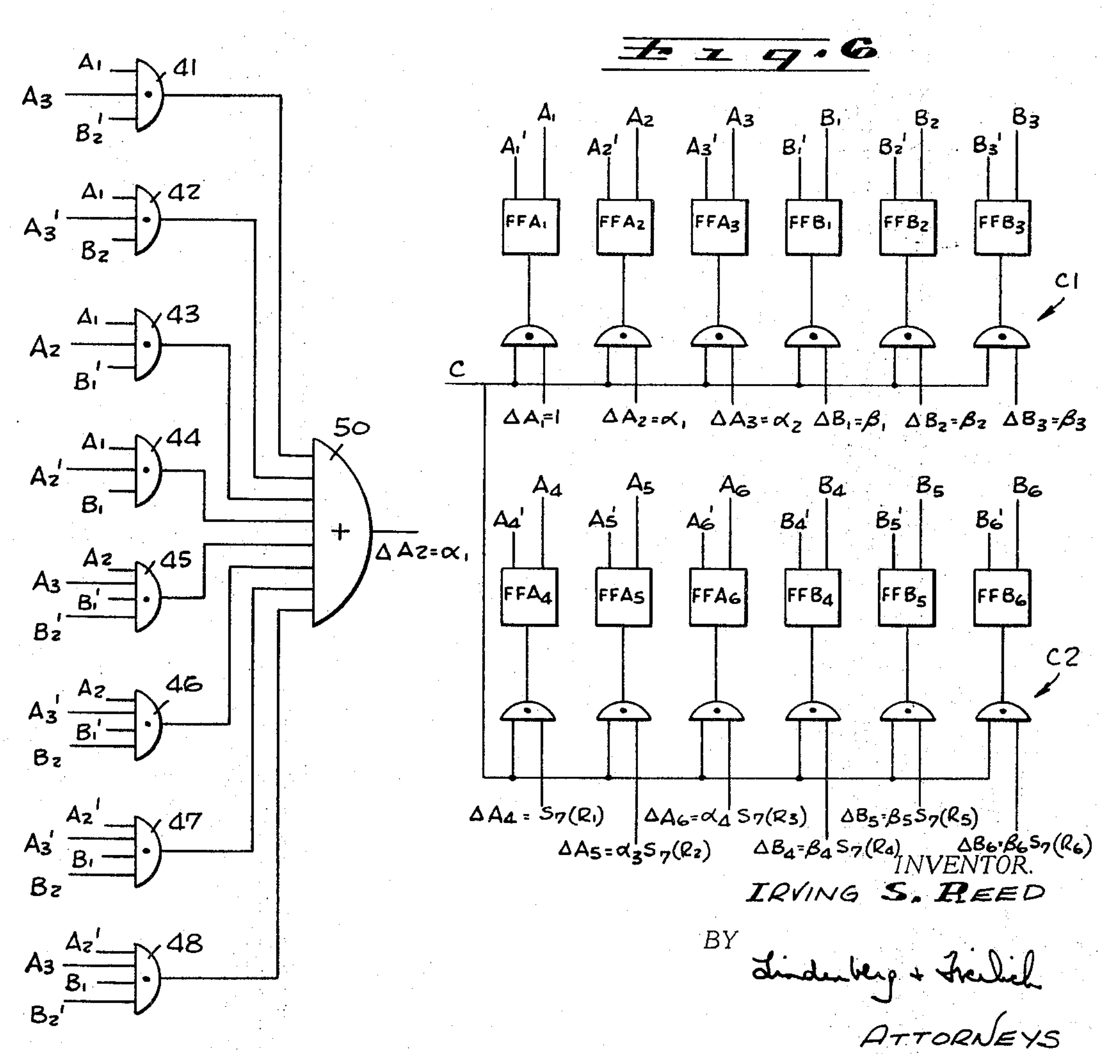
FIG. 4 is a diagram of logic elements which can be substituted for the majority elements shown in FIG. 1.
FIG. 6 is a block diagram of an embodiment of two 3-bit counters interconnected to act as a 6-bit counter.

Just as the logic arrangement of FIG. 4 is used to implement $\Delta A_2 = \alpha_1$, similar logic arrangements, employing a plurality of AND gates whose outputs are fed to OR gates, are utilized to implement the other Equations 7.

The foregoing comprises the description of two embodiments of a 3-bit counter with one error tolerance. In one embodiment majority logic is employed while in the other embodiment a different logic arrangement is utilized. Either embodiment is of an "up" counter since each clock signal increases the counter's binary count by one as seen from the binary numbers represented by $A_1$, $A_2$ and $A_3$ in Tables 1 and 2.

If desired the bit capacity of the "up" counter may be increase by adding additional data and parity bits. FIG. 6 is a block diagram of a six bit "up" counter with one error tolerance. It consists of the previously described three data bits $FFA_1$ $FFA_2$ $FFA_3$, the three parity bits $FFB_1$ $FFB_2$ $FFB_3$ and three additional data bits $FFA_4$ $FFA_5$ $FFA_6$ as well as three additional parity bits $FFB_4$ $FFB_5$ and $FFB_6$.

The change of state signals for the flip-flops are as follows:

$$\begin{aligned}\Delta A_1 &= 1 \\ \Delta A_2 &= \alpha_1 \\ \Delta A_3 &= \alpha_2 \\ \Delta B_1 &= \beta_1 \\ \Delta B_2 &= \beta_2 \\ \Delta B_3 &= \beta_3 \\ \Delta A_4 &= S_7(R_1) \\ \Delta A_5 &= \alpha_3 S_7(R_2) \\ \Delta A_6 &= \alpha_4 S_7(R_3)\end{aligned} \tag{8}$$

$$\Delta B_4=\beta_4 S_7(R_4)$$
$$\Delta B_5=\beta_5 S_7(R_5)$$
$$\Delta B_6=\beta_6 S_7(R_6)$$

where $\alpha_1$, $\alpha_2$, $\beta_1$, $\beta_2$ and $\beta_3$ are defined by Equations 7. $\alpha_3$, $\alpha_4$, $\beta_4$, $\beta_5$ and $\beta_6$ are the same as $\alpha_1$, $\alpha_2$, $\beta_1$, $\beta_2$ and $\beta_3$ respectively with $A_1$ $A_2$ $A_3$ $B_1$ $B_2$ and $B_3$ and their complements replaced by $A_4$ $A_5$ $A_6$ $B_4$ $B_5$ and $B_6$ in succession. that is, $$\begin{aligned}
\alpha_3 &= A_4A_6B_5'+A_4A_6'B_5+A_4A_5B_4'+A_4A_5'B_4 \\
&\quad +A_5A_6B_4'B_5'+A_5A_6'B_4'B_5+A_5'A_6'B_4B_5 \\
&\quad +A_5'A_6B_4B_5' \\
\alpha_4 &= A_4A_5B_5'B_6'+A_4A_6'B_4'B_6+A_5A_6B_4'B_5' \\
&\quad +A_4A_5B_5B_6+A_4A_6B_4'B_6'+A_5A_6'B_4'B_5 \\
\beta_4 &= A_4'A_3'B_5'+A_4'A_6B_5+A_4'A_5'B_4'+A_4'A_5B_4 \\
&\quad +A_5'A_6'B_4'B_5' \qquad (9) \\
&\quad +A_5'A_6B_4'B_5+A_5A_6B_4B_5+A_5A_6'B_4B_5' \\
\beta_5 &= A_4'A_5'+A_5'A_6'B_6'+A_5'A_6B_6+A_4'A_6'B_5' \\
&\quad +A_4'B_4B_5B_6'+B_4B_5'B_6+A_4'A_6B_5+A_5'B_4 \\
\beta_6 &= A_4A_5'B_5'B_6+A_4A_6'B_4B_6'+A_5'A_6B_4B_5'+A_4A_5'B_5B_6' \\
&\quad +A_5'A_6'B_4B_5+A_4A_6B_4B_6
\end{aligned}$$

In Equations 8 $S_7(R_i)$ ($i$=1, 2, 3, 4, 5, 6) denote distinct physical realization of $S_7$ (Redundant) which is derivable from the Karnaugh map shown in FIG. 2.

$$\begin{aligned}
S_7(\text{Redundant}) &= A_1A_2A_3(\text{Redundant}) \qquad (10) \\
&= A_1A_2B_2'B_3'+A_2A_3B_1'B_2'+A_1A_3B_1'B_3'
\end{aligned}$$

The foregoing expression for $S_7$ (Redundant) may be implemented by a logic circuit consisting of three four-input AND gates which are fed to a three-input OR gate. Six distinct physical realizations of $S_7$ are required for complete one-error toleration, i.e. six identical logic circuits for $S_7$ (Redundant) are needed. The counter of FIG. 6 can be thought of as consisting of two 3-bit counters with one error tolerance which are connected together in such a way that the total circuit is one-error tolerant. The counters are designated C1 and C2. The change of state signals for the bits of counter C1 are a function of only the states or values of the of the bits of C1. However, the change of state signals for the bits of C2 ade dependent on the states or values of the bits of both counters. Similarly, more than two 3-bit one error tolerant counters may be coupled to obtain a counter of 3$n$ bits which is one error tolerant, and wherein $n$ is an integer.

Figure 7:
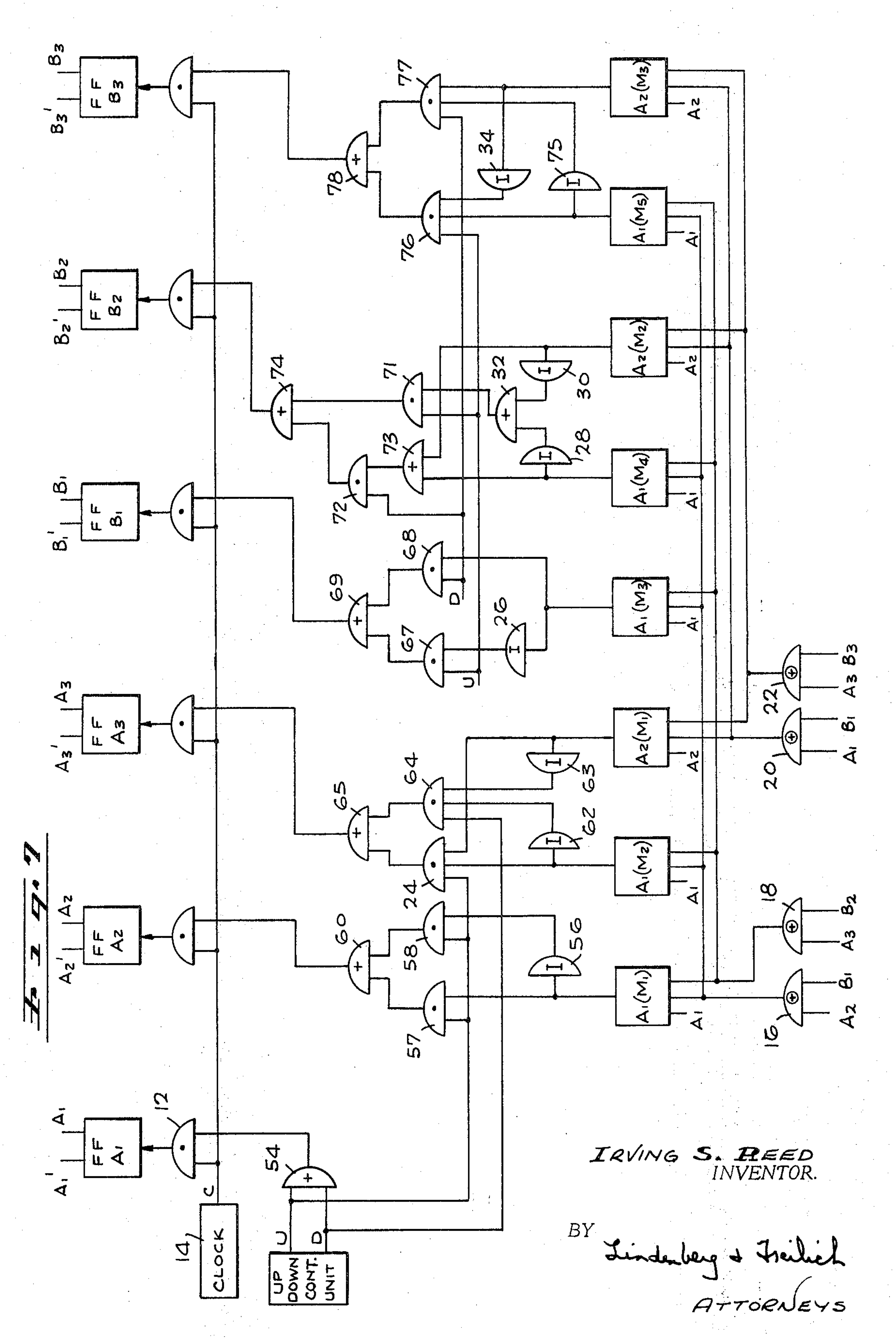
FIG. 7 comprises a block diagram of a one-bit error-tolerant up-down 3-bit counter.

The teachings of the invention can be employed also to devise an error-tolerant up-down counter. Such a counter utilizes additional logic circuits and input control signals. An arrangement for this circuit is shown in FIG. 7. This diagram displays a complete block diagram of a three bit up-down counter with one error tolerance which employs majority logic. In FIG. 7 elements like those shown in FIG. 1 are designated by like numerals.

The change of state equations for the up-down counter are as follows:

$$\begin{aligned}
\Delta A_1 &= U+D \\
\Delta A_2 &= UA_1+DA_1=UA_1(M_1)+DA_1'(M_1) \\
\Delta A_3 &= UA_1A_2+DA_1'A_2'=UA_1(M_2)A_2(M_1) \\
&\quad +DA_1'(M_2)A_2'(M_1) \\
\Delta B_1 &= UA_1'+DA_1=UA_1'(M_3)+DA_1(M_3) \qquad (11) \\
\Delta B_2 &= U(A_1'+A_2')+D(A_1+A_2)=U[A_1'(M_4) \\
&\quad +A_2'(M_2)]+D[A_1(M_4)+A_2(M_2)] \\
\Delta B_3 &= UA_1A_2'+DA_1'A_2=UA_1(M_5)A_2'(M_5)A_2'(M_3) \\
&\quad +D[A_1'(M_5)A_2(M_3)]
\end{aligned}$$

In the foregoing relationships U is "1" for counting up and D is "1" for counting down. As seen from FIG. 7, the counter includes a up-down control unit 52 which provides a "1" output on a line "U" to count up and a "1" on a line "D" to count down. These lines are fed to OR gate 54 which provides a "1" output if either U or D is "1."

The $\Delta A_2$ term is provided by the majority circuit $A_1$ ($M_1$) together with inverter 56, AND gates 57 and 58 and OR gate 60. Gates 57 and 58 produce the terms $UA_1(M_1)$ and $DA_1'(M_1)$ respectively. These are fed to OR gate 60. Inverters 62 and 63 and gates 64 and 65 are added to circuits $A_1(M_2)$, $A_2(M)$ and gate 24 to implement $\Delta A_3$, while $\Delta B_1$ is implemented by $A_1(M_3)$ inverter 26 together with gates 67, 68 and 69. AND gates 71 and 72 and OR gates 73 and 74 are added to implement $\Delta B_2$ while an inverter 75, AND gates 76 and 77 and an OR gate 78 are added to implement $\Delta B_3$.

Accordingly there has been shown and described herein a novel sequential circuit, which has been made error-tolerant, by the addition of parity bits and redundant logic circuits. For each internal state of the circuit a fixed preselected state relationship exists for the parity bits ($B_i$). The outputs of the parity bits and the circuit's data bits ($A_i$) are utilized in redundant logic circuitry to provide each bit with a change of state signal. By employing the redundancy of logic any one bit or bistable element or any one logic circuit, either a majority circuit or gate, may fail. However, despite such failures a sufficient number of bistable elements and logic circuits are contained in the sequential circuit to provide the correct binary code for each internal state.

Therefore, the invention has been described in conjunction with specific embodiments of a 3-bit binary counter with one error tolerance. The process used to derive the values of the parity bits ($B_i$) for each of the counter's eight interval states as outlined in Table 2, and the change-of-state equations can be used to design any elementary sequential binary circuit with any desired error tolerance. It is the purpose of the following description to illumine this process in all its generality. The steps of this process are as follows:

Step 1

Start with the complete logical design of the sequential circuit. The binary equivalents of the internal states we donate by $S_0, S_1, S_2 \ldots S_{m-1}$. This requires $k=[\log_2 m]$ bits to represent the internal states. Denote these bits by $A_1, A_2 \ldots A_k$.

Step 2

Consider a parity check matrix for any binary error-correcting code of $n$ columns and $(n-k)$ rows. Transform this matrix to the reduced-echelon form.

$$H=\begin{bmatrix}
q_{11} & \cdots & q_{1,k} & 1 & 0 & \cdots & 0 \\
q_{21} & \cdots & q_{2,k} & 0 & 1 & \cdots & 0 \\
\cdot & & \cdot & \cdot & \cdot & & \cdot \\
\cdot & & \cdot & \cdot & \cdot & & \cdot \\
\cdot & & \cdot & \cdot & \cdot & & \cdot \\
q_{n-k} & & q_{n-k,k} & 0 & 0 & & 1
\end{bmatrix} \qquad (1x)$$

The coded words for states $S_0, S_1 \ldots S_{m-1}$ compose the set V of all $v$ such that $$vHT=0 \qquad (2x)$$

where $$v=(A_1, A_2 \ldots A_k, B_1, B_2 \ldots B_{n-k})$$

is a row vector of the internal state bits $A_1, A_2 \ldots A_k$ and auxiliary bits $B_1, B_2 \ldots B_{n-k}$ and T denotes matrix transpose. By Eq. (2x), bits $B_i$ are determined by $$B_i=\sum_{j=1}^{k} q_{ji}A_j=q_{1i}A_1\oplus q_{2i}A_2\oplus \cdots q_{ki}A_k \qquad (3x)$$

for $i$=1, 2 . . . $n-k$, and where the sun symbol $\oplus$ denotes sum modulo two or the "exclusive or" operation.

Step 3

Replace states $S_j$ by states $S_j^*$ in such a way that if $S_j$ corresponds to $A_1^{(j)}, A_2^{(j)} \ldots A_k^{(j)}$, that $S_j^*$ corresponds to $A_1^{(j)}, A_2^{(j)} \ldots A_k^{(j)}, B_1^{(j)} \ldots B_{n-k}^{(j)}$, where $A_i^{(j)}=0$ or 1 and $B_i^{(j)}$ is determined by Eq. (3x).

Designate flip-flops $B_i$ as auxiliary bits. Determine the change or driving circuits for the $B_i$ in terms of bits $A_j$ ($j$=1, 2 . . . $k$) and other input variables, thereby completing the logical design of the sequential circuit with states $S_j^*$ replacing $S_j$ for $j$=0, 1, 2 . . . $m-1$.

Step 4

Since an element $v$ of code V is orthogonal to any row of H, $v$ is orthogonal to every element of V⊥, where V⊥ is the vector space generated by the rows of H; i.e. if $v$ is in V and $u$ is in V⊥, then $v \cdot u^T = 0$. V⊥ is the dual code of V. Consider any $u^{(1)}$ in V⊥ such that the $A_j$ component $A_j^{(1)} = 1$, i.e.

$$u^{(1)} = (A_1^{(1)}, A_2^{(1)} \ldots A_j^{(1)} \ldots A_k^{(1)}, B_1^{(1)} \ldots B_{n-k}^{(1)})$$

where $A_i^{(1)}$ and $B_i^{(1)}$ are either 0 or 1. Since $vu^{(1)}T = 0$, where $v = (A_1, A_2 \ldots A_k, B_1 \ldots B_{n-k})$, we may solve for $$A_j = \sum_{i=1}^{(j)} A_i^{(1)} A_i \oplus \sum_{i=1}^{n-k} B_1^{(1)} A_1 = A_{j(1)}$$

Similarly, find $u^{(2)}$ such that $u^{(2)} \neq u^{(1)}$ and $A_j^{(2)} = 1$, $u^{(3)}$ such that $u^{(3)} \neq u^{(1)} \neq u^{(2)}$ and $A_j^{(3)} = 1$, and in general $u^{(r)}$ such that $u^{(r)} \neq u^{(r-1)} \neq \ldots u^{(1)}$ and $A_j^{(r)} = 1$. In this way $A_j$ is determined at most $2^{(n-r-1)}$ times by the equations $$A_j = \sum_{i=1}^{k(j)} A_i^{(r)} A_i \oplus \sum_{i=1}^{n-k} B_1^{(r)} A_1 = A_{j(r)} \qquad (4x)$$

for $r = 1, 2 \ldots 2^{(n-r-1)}$ and $j = 1, 2 \ldots k$, where $$\sum_{i=1}^{k(j)}$$

denotes the sum modulo with the $j^{th}$ term skipped. From this set of determinations for $A_j$, find that subset S of V⊥ from which a set of equations of type (4x) can be derived with the least overlap (or are closest to two-step orthogonality), and such that a majority test of the determinations allows for at least $d$-errors where $d$ is the number of errors the code will correct. If the number of one's in any row of H is exactly three, then the codes are modified first-order Reed Muller Codes, and the set S of least overlap is easily computed.

Implement physically all possible parity equations of type (4x) generated by the set S for each $A_j$ ($j = 1, 2 \ldots k$).

Step 5

Consider a driving equation for either flip-flop $A_i$ or $B_j$ as determined by Step 3. This will be either one or two functions of form $$f(A_1, A_2 \ldots A_k, C_1, C_2 \ldots C_r)$$

of the original internal state variables $A_1 \ldots A_k$ and input variables $C_1, C_2 \ldots C_r$. For $A_j$ substitute $$A_j(1) = Maj_{(1)}(A_{j(0)}, A_{j(1)} \ldots A_{j(2n_1+1)})$$

where $A_{j(0)} = A_j$ and $A_{j(r)}$ are given by Eq. (4x) for ($j = 1, 2 \ldots k$), $$Maj_{(1)}(x_1, x_2 \ldots x_{2n_1+1}) = 1 \text{ if } \sum_{i=1}^{2n_1+1} x_i > n_1$$

$$= 0 \text{ if } \sum_{i=1}^{2n_1+1} x_i \leq n_1 \qquad (5x)$$

is the first majority circuit used for $A_j$ (the sum in Eq. (5x) is the ordinary arithmetic sum) and $n_1$ is the number of vectors in S such that $A_j = 1$. Substitute $A_j(1)$ for $A_j$ in $f(A_1 \ldots A_k, C \ldots C)$ only if $f$ is an explicit function of $A_j$.

For the driving equations for each flip-flop of set $A_1, A_2 \ldots A_k, B_1, B_2 \ldots B_{n-k}$ repeat the above process but *never* use the same majority circuit for the driving equations of *different* flip-flops. Denote the $k^{th}$ physically realized majority circuit for variable $A_j$ by $$A_j(k) = Maj_k\ (A_{j(0)}, A_{j(1)} \ldots A_{j(2nj+1)}) \qquad (6x)$$

Always utilize a majority circuit for a primary internal state variable $A_j$ in a flip-flop channel which is separate and distinct from those majority circuits for $A_j$ in other flip-flop channels.

The above sequence of steps makes possible the failure of one or more circuits in $d$ or less flip-flop channels. In spite of the failure of these flip-flop channels, the sequential circuit will continue to operate satisfactorily and produce correct outputs by way of further majority elements or decoding circuits.

It should be appreciated that those familiar with the art may make modifications and/or substitute equivalents in the arrangement as shown wihtout departing from the spirit of the invention. It should further be appreciated that error-indicating circuits and means may be added to any one of the foregoing described embodiments to indicate the presence of an eiror in any of the flip-flops or the logic circuits. These circuits and means may take the form of lights, alarms, etc. Therefore, all such additions, modifications and/or equivalents are deemed to fall within the scope of the invention as claimed in the appended claims.

What is claimed is:

1. An error-tolerant binary circuit comprising:

K bistable data elements, each data element being drivable from one stable state to the other, an element in one stable state providing an output representative of the digit, one, and the other stable state providing an output representative of the digit, zero;

a plurality of bistable check elements, each check element being drivable from one stable state to the other, a check element in one stable state providing an output representative of the digit, one, and the other stable state providing an output representative of the digit, zero;

first logic means to which outputs of said data element and said check elements are supplied for providing control signals representative of the relationship of the states of the bistable elements, supplying said outputs;

second logic means for utilizing said control signals and the outputs of the K data elements for providing each of the data and check elements with a separate change of state signal;

a source of clock signals;

a separate bistable element control means coupled to each bistable element;

first connecting means supplying each control means with the change of state signal of the bistable element associated therewith; and second connecting means for simultaneously supplying all the control means with clock signals from said source, whereby a bistable element changes from one state to the other in response to the clock signal if and only if the change of state signal supplied to the control means thereof is of a predetermined value, said binary circuit including a sufficient number of logic means so that each of the circuit's internal states is accurately definable therein even when $d$ bistable elements and logic means fail, $d$ being not greater than a predetermined number.

2. A sequential binary counter for providing an accurate binary count of clock signals supplied thereto irrespective of failure of not more than $d$ elements therein comprising:

K bistable data elements each drivable from one stable state in which the element output represents the digit, one, to the other stable state in which the element output represents the digit, zero;

a plurality of bistable check elements each drivable from one stable state in which the element output represents the digit, one, to the other stable state in which the element output represents the digit, zero, the number of check elements being a function of $k$ and $d$;

a first plurality of logic-performing elements each responsive to the outputs of at least two of said bistable elements to provide an output which is in a first state when the outputs supplied to the element are in a preselected relationship and in a second state when the outputs supplied to the element are in a different than said preselected relationship;

a second plurality of logic-performing elements coupled to said bistable data and check elements and to said first plurality of logic elements for providing a different change of state signal for each bistable element, the level of each change of state signal being a function of the outputs of a physically distinct group of logic performing elements in said first plurality; and a source of clock signals for simultaneously providing clock signals to said data and check elements to simultaneously change the states of all bistable data elements whose change of state signals are of a predetermined level.

3. The counter as recited in claim 2 wherein said second plurality of logic-performing elements includes separate distinct logic-performing elements for providing each of said change of state signals, whereby failure of any one of the logic-performing elements in said second plurality does not affect the accurate performance of elements performing an identical logic operation.

4. The counter as recited in claim 3 wherein each logic-performing element in said first plurality is an EXCLUSIVE OR gate for performing the EXCLUSIVE OR operation on at least the outputs of two of said bistable elements, and said second plurality of logic-performing elements includes majority elements responsive to the outputs of at least two EXCLUSIVE OR gates and the output of one data element.

5. The counter as recited in claim 4 wherein $k=3$, $d=1$, said counter including three check bits $FFB_1$, $FFB_2$ and $FFB_3$, said first plurality of logic-performing elements including first, second, third and fourth two-input EXCLUSIVE OR gates performing respectively the operations $A_2 \oplus B_1$, $A_3 \oplus B_2$, $A_1 \oplus B_1$ and $A_3 \oplus B_3$, where $A_1$, $A_2$ $A_3$ are the respective outputs of three data elements $FFA_1$, $FFA_2$ and $FFA_3$, the $A_1$ output being the least significant bit, and said second plurality of logic performing elements includes five physically distinct majority circuits each responding to the output of $FFA_1$, and the first and second EXCLUSIVE OR gates, said second plurality of logic-performing elements further including three physically distinct majority circuits each responding to the outputs of $FFA_2$ and the third and fourth EXCLUSIVE OR gates.

6. The counter as recited in claim 3 wherein $k=3$ comprising elements $FFA_1$, $FFA_2$, $FFA_3$, $d=1$ and said plurality of check elements includes three elements $FFB_1$, $FFB_2$ and $FFB_3$, and said first and second pluralities of logic-performing elements include physically distinct AND gates and five OR gates to provide change of state signals $\alpha_1$, $\alpha_2$, $\beta_1$, $\beta_2$ and $\beta_3$ for element $FFA_2$, $FFA_3$, $FFB_1$, $FFB_2$ and $FFB_3$ respectively, where $$\alpha_1 = A_1A_3B_2' + A_1A_3'B_2 + A_1A_2B_1' + A_1A_2'B_1 + A_2A_3B_1'B_2' + A_2A_3'B_1'B_2 + A_2'A_3'B_1B_2 + A_2'A_3B_1B_2'$$

$$\alpha_2 = A_1A_2B_2'B_3' + A_1A_3'B_1'B_3 + A_2A_3B_1'B_2' + A_1A_2B_2B_3 + A_1A_3B_1'B_3' + A_2A_3'B_1'B_2$$

$$\beta_1 = A_1'A_3'B_2' + A_1'A_3B_2 + A_1'A_2'B_1' + A_1'A_2B_1 + A_2'A_3'B_1'B_2' + A_2'A_3B_1'B_2 + A_2A_3B_1B_2 + A_2A_3'B_1B_2'$$

$$\beta_2 = A_1'A_2' + A_2'A_3'B_3' + A_2'A_3B_3 + A_1'A_3'B_2' + A_1'B_1B_2B_3' + B_1B_2'B_3 + A_1'A_3B_2 + A_2'B_1$$

$$\beta_3 = A_1A_2'B_2'B_3 + A_1A_3'B_1B_3' + A_2'A_3B_1B_2' + A_1A_2'B_2B_3' + A_2'A_3'B_1B_2 + A_1A_3B_1B_3$$

7. The counter as recited in claim 3 wherein $k=6$ comprising of data elements $FAA_1$, $FAA_2$, $FAA_3$, $FAA_4$, $FAA_5$ and $FAA_6$, $d=1$, and said plurality of check elements includes six elements $FFB_1$, $FFB_2$, $FFB_3$, $FFB_4$, $FFB_5$ and $FFB_6$ and said pluralities of first and second logic-performing elements include AND and OR gates, for providing change of state signals $\alpha_1$, $\alpha_2$, $\beta_1$, $\beta_2$, $\beta_3$, $S_7(R_1)$, $\alpha_3$ $S_7(R_2)$, $\alpha_4$ $S_7(R_3)$, $\beta_4$ $S_7(R_4)$, $\beta_5$ $S_7(R_5)$ and $\beta_6$ $S_7(R_6)$, for $FFA_2$, $FFA_3$, $FFB_1$, $FFB_2$, $FFB_3$, $FFA_4$, $FFA_5$, $FFA_6$, $FFB_4$, $FFB_5$ and $FFB_6$ respectively, where $$\alpha_1 = A_1A_3B_2' + A_1A_3'B_2 + A_1A_2B_1' + A_1A_2'B_1 + A_2A_3B_1'B_2' + A_2A_3'B_1'B_2 + A_2'A_3'B_1B_2 + A_2'A_3B_1B_2'$$

$$\alpha_2 = A_1A_2B_2'B_3' + A_1A_3'B_1'B_3 + A_2A_3B_1'B_2' + A_1A_2B_2B_3 + A_1A_3B_1'B_3' + A_2A_3'B_1'B_2$$

$$\beta_1 = A_1'A_3'B_2' + A_1'A_3B_2 + A_1'A_2'B_1' + A_1'A_2B_1 + A_2'A_3'B_1'B_2' + A_2'A_3B_1'B_2 + A_2A_3B_1B_2 + A_2A_3'B_1B_2'$$

$$\beta_2 = A_1'A_2' + A_2'A_3'B_3' + A_2'A_3B_3 + A_1'A_3'B_2' + A_1'B_1B_2B_3' + B_1B_2'B_3 + A_1'A_3B_2 + A_2'B_1$$

$$\beta_3 = A_1A_2'B_2'B_3 + A_1A_3'B_1B_3' + A_2'A_3B_1B_2' + A_1A_2'B_2B_3' + A_2'A_3'B_1B_2 + A_1A_3B_1B_3$$

$\alpha_1$, $\alpha_2$, $\beta_1$, $\beta_2$ and $\beta_3$ are defined by equations (7). $\alpha_3$, $\alpha_4$, $\beta_4$, $\beta_5$ and $\beta_6$ are the same as $\alpha_1$, $\alpha_2$, $\beta_1$, $\beta_2$ and $\beta_3$ respectively with $A_1$ $A_2$ $A_3$ $B_1$ $B_2$ and $B_3$ and their complements are replaced by $A_4$ $A_5$ $A_6$, $B_4$, $B_5$ and $B_6$ in succession. That is $$\alpha_3 = A_4A_6B_5' + A_4A_6'B_5 + A_4A_5B_4' + A_4A_5'B_4 + A_5A_6B_4'B_5' + A_5A_6'B_4B_5 + A_5'A_6'B_4B_5 + A_5'A_6B_4B_5'$$

$$\alpha_4 = A_4A_5B_5'B_6' + A_4A_6'B_4'B_6 + A_5A_6B_4'B_5' + A_4A_5B_5B_6 + A_4A_6B_4'B_6' + A_5A_6'B_4'B_5$$

$$\beta_4 = A_4'A_3'B_5' + A_4'A_6B_5 + A_4'A_5'B_4' + A_4'A_5B_4 + A_5'A_6'B_4'B_5' + A_5'A_6B_4'B_5 + A_5A_6B_4B_5 + A_5A_6'B_4B_5'$$

$$\beta_5 = A_4'A_5' + A_5'A_6'B_6' + A_5'A_6B_6 + A_4'A_6'B_5' + A_4'B_4B_5B_6' + B_4B_5'B_6 + A_4'A_6B_5 + A_5'B_4$$

$$\beta_6 = A_4A_5'B_5'B_6 + A_4A_6'B_4B_6' + A_5'A_6B_4B_5' + A_4A_5'B_5B_6' + A_5'A_6'B_4B_5 + A_4A_6B_4B_6$$

and where $S_7(R_i)$ ($i=1, 2, 3, 4, 5, 6$) denote distinct physical realizations of $S_7$ (Redundant) where $$S_7\,(\text{Redundant}) = A_1A_2B_2'B_3' + A_2A_3B_1'B_2' + A_1A_3B_1'B_3'$$

8. A sequential circuit for providing an error-free binary output which is a function of the binary state of at least one of $k$ bistable data elements thereof, irrespective of malfunctioning of not more than $d$ elements or logic means therein comprising:

$k$ bistable data elements;

$y$ bistable check elements, $y$ being a function of $d$ and $k$;

means responsive to clock signals to enable the simultaneous change of the state of each of said $k$ and $y$ bistable elements; and Redundant logic means responsive to the states of said $k$ data elements and said $y$ check elements for providing each bistable element with a change of state signal;

means for providing clock signals; and $k$ and $y$ control means simultaneously responsive to each clock signal, each control means being associated with a different bistable element to change the state of the element in response to the clock signal if and only if the change of state signal of the element is of a selected value, whereby for each preselected state relationship of the $k$ data elements with which a predetermined state relationship of the $y$ check elements is associated, said circuit includes, among said elements and logic means, a sufficient number of elements and logic means which are in said preselected state relationship, despite malfunctioning of not more than $d$ elements and logic means therein.

9. The sequential circuit as recited in claim 8 wherein said circuit is a $k$ bit counter, sequentially operable to define $2^k$ state relationships for said $k$ data elements, with predetermined states for said $y$ check elements associated with each of said $2^k$ states, said circuit including for each of said $2^k$ state relationships at least one group of $k$ elements and logic means whose states are in the desired relationship irrespective of the malfunctioning of not more than $d$ elements and logic means therein.

10. The sequential circuit as recited in claim 9 further including means responsive to an "up" input control signal supplied thereto to sequentially change the state relationship of said $k$ data elements from one state to a different state which represents a greater by one binary number, said means being further responsive to a "down" input control signal to control the change of states of the $k$ data elements to represent a smaller by one binary number.

References Cited

Logic Redundancy Improves Digital System Reliability. In NASA Tech Brief, 65–10025, February 1965.

Goldberg, J. Simplified Circuit Corrects Faults in Parallel Binary Information Channels. In NASA Tech Brief, 66–10261, June 1966.

EUGENE G. BOTZ, Primary Examiner

R. S. DILDINE, Jr., Assistant Examiner

U.S. Cl. X.R.

340—146.1